United States Patent [19]
Merenheimo et al.

[11] 3,785,448
[45] Jan. 15, 1974

[54] DEVICE IN CONNECTION WITH THE STEERING SKI OF A VEHICLE FOR IMPROVING ITS CONTROL

[75] Inventors: Markku Merenheimo, Oulu; Mauno Ruuska, Muhos, both of Finland

[73] Assignee: Valmet Oy, Helsinki, Finland

[22] Filed: Apr. 7, 1972

[21] Appl. No.: 242,186

[30] Foreign Application Priority Data
Jan. 26, 1972 Finland.................................. 202/72

[52] U.S. Cl................... 180/5 R, 280/21 R, 280/28
[51] Int. Cl............................................. B62b 17/02
[58] Field of Search........................... 280/28, 21 R; 180/5 R

[56] References Cited
UNITED STATES PATENTS
2,404,402   7/1946   Porter.................................. 280/28
3,632,126   1/1972   Shorrock ............................. 280/28
3,319,971   5/1967   Thomas ............................. 280/28 X
3,643,978   2/1972   Westberg............................. 280/28

*Primary Examiner*—Richard J. Johnson
*Attorney*—Richards & Geier

[57] ABSTRACT

Device adapted for steering a motor sleigh and for improving the control of the vehicle, having on both marginal portions of the steering ski a steering plate or plates which are positioned at a given distance from the edge of the steering ski such that the steering effect of the steering plates becomes less with increasing turning angle of the steering ski as a result of the tilting of the steering ski.

8 Claims, 8 Drawing Figures

PATENTED JAN 15 1974

3,785,448

DEVICE IN CONNECTION WITH THE STEERING SKI OF A VEHICLE FOR IMPROVING ITS CONTROL

The present invention concerns a device in connection with the steering ski or skis of a vehicle, in particular a motor sleigh, for the purpose of improving its control.

In designs of prior art the bottom of the steering ski has been profiled to have ridges of various types, but especially on hard snow or ice no adequate control characteristics are attained by such profiling. To rectify this situation, plates or cutting edges have been affixed to the sides of the ski. These effect considerable improvement of control when driving over a hard surface. According to the Finnish Pat. application No. 3122/70 a steering ski is previously known which has sliding edges intended to cause the ski to "bite" into the surface in sharp bends and to prevent the vehicle from slipping in the previous direction of travel. These designs have an obvious drawback as regards the safety of driving: the said steering elements bite harder into the base with increasing turning angles of the ski. Since motor sleighs are largely intended for recreational use, the drivers are not always skilled enough and such situations are likely to occur in which the steering column is turned in excess. Since the steering aids of prior art boost the turning especially when the turning angle is large, this will result, in the worst instance, in a tilt of the sleigh towards the outer side of the curve and spilling of the driver on the hard ground.

The aim of the present invention is to avoid the above drawbacks. The device according to the invention is mainly characterized in that on both side portions of the steering ski a steering plate or steering plates have been fitted at a given distance from the edge of the steering ski, so that the steering effect of the steering plates decreases with increasing turning angle of the steering ski, as a result of the inclination of the steering ski. The inclination of the ski at turning is accomplished in a manner previously known in itself, the steering shaft being positioned at an angle of 20° to 45° against the vertical, which has the effect that the ski is tilted when a turn is executed.

The invention and the advantages which are gained thereby are described in detail with reference to the embodiment examples shown in the figures of the attached drawing, to which embodiments the invention is in no way confined.

Figure 1:
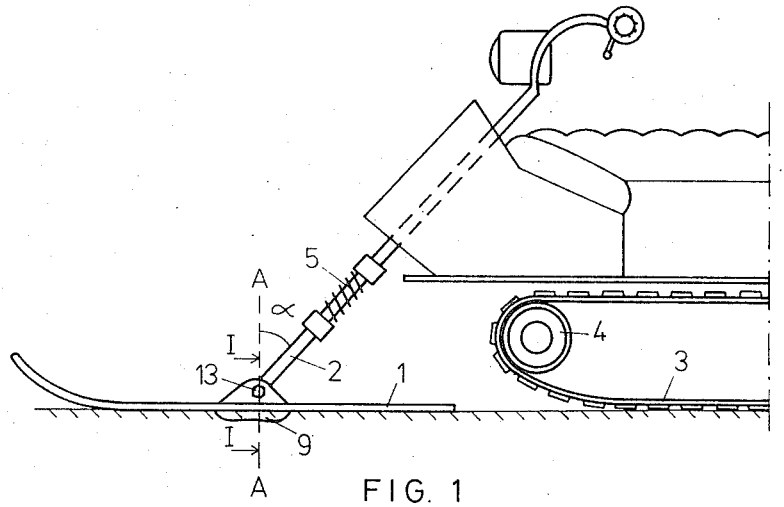
FIG. 1 shows the front part of a vehicle, in this case a motor sleigh, with its steering ski.

The device according to the invention in connection with a steering ski is appropriate for use on various kinds of vehicles, of which in FIG. 1 a motor sleigh has been presented, its track mat having been indicated with the reference numeral 3 and the return roll of this track mat with 4. The steering ski 1 has been fixed to its turning shaft 2, which is provided with a spring arrangement 5 previously known in itself. The steering shaft 2 encloses with the vertical plane A—A an angle $\alpha$, which has a magnitude between 20° and 45°. As a result of this angle $\alpha$ the steering ski 1 tilts when a turn is being executed.

According to the invention the steering plates 9, or 12 respectively, have not been placed on the edge of the steering ski 1 but at a distance from the edge of the steering ski 1, so that the steering effect of the steering plates 9, 12 is reduced at large turning angles as a result of the tilting of the steering ski. This effect has been illustrated in FIG. 4.

Figure 2:
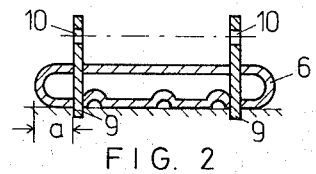
FIG. 2 shows the cross section of a steering ski along the line I—I in FIG. 1.
Figure 3:
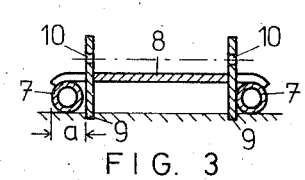
FIG. 3 shows in like manner another type of steering ski. In both figures the steering plate and the attachment lugs of the ski are of one piece.
Figure 4:
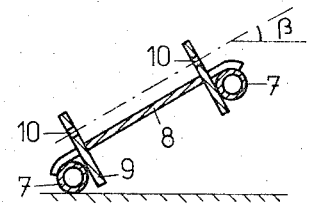
FIG. 4 shows a steering ski as in FIG. 3, in the situation when a turn is being executed.
Figure 5:
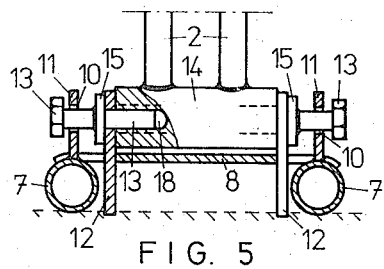
FIG. 5 shows a steering plate design, applied in connection with a steering ski according to FIG. 3.

The placement of the steering plates according to the invention may be applied in the instances of various kinds of steering skis. FIG. 2 shows a ski that has been formed of a box-type beam 6 having a bottom which is shaped to have a certain profile. The steering plates 9 have been affixed to pass through the ski so that they simultaneously constitute attachment lugs, by holes 10 in which the steering ski 1 has been attached to the steering shaft 2 with the aid of screws 13. The invention is applicable with particular advantage to a kind of steering ski, as shown in FIGS. 3, 4 and 5, the edge of which is encircled by a reinforcing profile 7, e.g., a tube, on top of which the supporting plate 8 has been affixed. According to FIG. 3, the steering plates 9 have been affixed to the inner sides of the reinforcing profiles 7, whereby the distance a of the steering plates from the edges of the ski will be rather appropriate. In this case, too, the steering plates 9 at the same time constitute the attachment lugs of the steering ski 1.

As shown in FIG. 4, the steering ski has been tilted to be at an angle $\beta$ with reference to the base over which it travels, so that the lower edge of the steering plate 9 just loses contact with the base.

Figure 6:
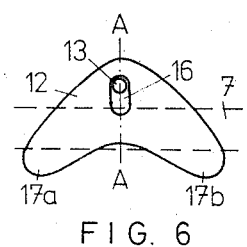
FIGS. 6, 7 and 8 show the steering plate of FIG. 5 in different positions.
Figure 7:
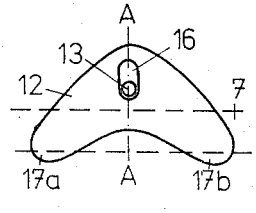
Figure 8:
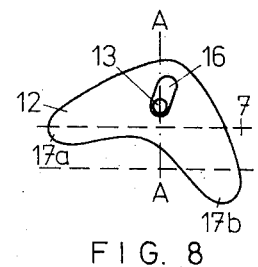

The steering plate 12 may be arranged to be adjustable, as shown in FIGS. 5, 6, 7 and 8, so that the steering behaviour desired in each particular instance is achieved. To the reinforcement profiles 7 of the steering ski 1 particular attachment lugs 11 have been affixed, through holes 10 in which the steering ski 1 has been connected with the horisontal axle 14 at the lower end of the turning shaft 2 by means of screws 13. The horizontal axle 14 has threaded bores 18, and the steering plate 12 is fixed in desired position by the aid of the screw 13, between the plate 15 and the end face of the horizontal axle 14. The steering plate 12 is substantially triangular and has an elongated hole 16, through which the screw 13 passes. The lower part of the steering plate 12 has projecting parts 17a and 17b. In FIG. 6 the steering plate 12 has been shown in its extreme lower position, in which its effect is at its maximum. In its upper extreme position, shown in FIG. 7, the steering plate 12 exerts hardly any effect in practice. It is moreover possible, by swivelling the steering plate 12 about the axis defined by the screw 13, to shift the point of action of the steering plate 12 in the longitudinal direction of the steering ski 1. In the position of FIG. 8 the sole effective part of the steering plate 12 is its projection 17b, and the point of action is located to the rear of the plane A—A.

I claim:

1. Steering ski for a motor sleigh, comprising an elongated ski body; a steering axle attached thereto by attachment means and inclined with reference to the vertical relative to said ski body means for bracing said ski body in its longitudinal direction and in its central portion, against the lower end of the steering axle such that the steering ski is tilted when said steering axle is rotated; a sliding surface on the under side of said ski body, said sliding surface having both lateral edges rounded in substantial degree; guiding plates affixed to the ski body in parallel position relative to the longitudinal direction of the steering ski extending a distance below said sliding surface and located symmetrically with reference to the centerline of said steering ski at a substantial distance from said rounded lateral edges of said sliding surface towards said centerline of the steering ski, such that the guiding effect provided by said guiding plates is adapted to decrease when the turning angle of the steering ski exceeds a given angle and the steering ski tilts a given amount, thereby enabling said steering ski to slip sidewise on the rounded edge of its sliding surface.

2. Device according to claim 9 wherein the steering plates consist of and substantially constitute at least a portion of the attachment lugs of said steering ski to said steering axle.

3. Device according to claim 9 in which the steering ski comprises a reinforcement profile encircling the marginal parts of the ski, said profile consisting of tubular material having affixed on the top thereof the supporting plate of the ski, and in which the said steering plate is located against or proximate to the inner side of said reinforcement profile.

4. Device according to claim 3, wherein said steering plate is affixed to the inner side of said reinforcement profile.

5. Device according to claim 9 wherein one or more actions of said steering plate is adjustable.

6. Device according to claim 5, wherein said steering plate is substantially triangular and has projecting parts positioned on its lower edge such that by rotating the steering plate in its plane, the point of action of said steering plate is influenced relative to the longitudinal direction of said steering ski.

7. Device according to claim 6, wherein said steering plate is securable in different positions through the attachment means of said steering ski.

8. Device according to claim 7, wherein said steering plate has an elongated hole through which the attachment means pass and adapted such that said steering plate is securable in different positions of height with reference to the steering ski.

* * * * *